United States Patent
Aulanko et al.

[11] Patent Number: 6,021,873
[45] Date of Patent: Feb. 8, 2000

[54] PROCEDURE AND APPARATUS FOR THE MEASUREMENT OF ELEVATOR LOAD

[75] Inventors: Esko Aulanko, Kerava; Harri Hakala; Jorma Mustalahti, both of Hyvinkää, all of Finland

[73] Assignee: Kone Oy, Helsinki, Finland

[21] Appl. No.: 08/985,783

[22] Filed: Dec. 5, 1997

[30] Foreign Application Priority Data

Dec. 20, 1996 [FI] Finland ................................ 965139

[51] Int. Cl.[7] .................................................. B66B 7/08
[52] U.S. Cl. ........................................ 187/411; 187/391
[58] Field of Search .................................. 187/281, 392, 187/393, 411, 391

[56] References Cited

U.S. PATENT DOCUMENTS

| | | | |
|---|---|---|---|
| 4,172,685 | 10/1979 | Nabeshima et al. | 414/139 |
| 4,222,140 | 9/1980 | Olewinski et al. | 14/71.3 |
| 4,573,542 | 3/1986 | Schlegel et al. | |
| 5,149,922 | 9/1992 | Kondou | 187/131 |
| 5,156,239 | 10/1992 | Ericson et al. | 187/73 |
| 5,306,879 | 4/1994 | Pearson | 187/131 |
| 5,421,433 | 6/1995 | Yoo | 187/391 |

FOREIGN PATENT DOCUMENTS

| | | |
|---|---|---|
| 4 30344A2 | 6/1991 | European Pat. Off. |
| 9 4475 | 3/1996 | Finland |
| 3 307020 A1 | 8/1984 | Germany |
| 6-255933 | 9/1994 | Japan |

*Primary Examiner*—Jonathan Salata
*Attorney, Agent, or Firm*—Birch, Stewart, Kolasch & Birch, LLP

[57] ABSTRACT

A procedure and apparatus for the measurement of elevator load uses a load measuring apparatus. The elevator comprises an elevator car (17) travelling along guide rails (2) in an elevator shaft, a counter-weight (20), a hoisting machinery (18, 19), a control unit, and hoisting ropes (11) attached at least by one end to an anchorage (21) in the elevator shaft. The load measuring apparatus (16) comprises a strain gauge (15) which outputs an electric signal corresponding to the load. The load measuring apparatus (16) is attached in conjunction with the anchorage (21) of the hoisting rope ends to a fixed place in the elevator shaft.

19 Claims, 2 Drawing Sheets

PROCEDURE AND APPARATUS FOR THE MEASUREMENT OF ELEVATOR LOAD

BACKGROUND OF THE INVENTION

The present invention relates to a procedure and to an apparatus for measuring the load of an elevator.

DESCRIPTION OF THE BACKGROUND ART

U.S. Pat. No. 5,306,879 describes an arrangement for the measurement of elevator load. This solution uses a load measuring device mounted in conjunction with the elevator car to determine the car load resulting from the weight of passengers and goods. An elevator implemented according to said patent has a supporting frame comprising an upper transverse beam, vertical supports and a lower transverse beam, which frame is suspended on the suspension rope of the elevator and moved in the elevator shaft along elevator guide rails. A bottom frame placed on the lower transverse beam supports the elevator car, which is mounted on spring elements. Placed on the top of the elevator car is reference plate belonging to the load measuring system. The upper transverse beam is provided with an approach sensor placed at a distance from the reference plate, so that the approach sensor is not in contact with the reference plate. In the case of an empty elevator car, the approach sensor is at a certain distance from the reference plate, and this distance increases with the load, depending on the elasticity of the spring elements. Thus, the approach sensor produces an electric signal which is dependent on the distance between the sensor and the reference plate.

A drawback with prior-art load measuring devices mounted in conjunction with the elevator car like e.g. the device presented in the above-mentioned U.S. patent is the length of the connecting cables, which causes many disturbances in the measurement itself. A further drawback is difficult installation, because the connecting cables have to be passed along with other electric cables starting from the elevator car to a control panel in the machine room.

SUMMARY OF THE INVENTION

The object of the present invention is to eliminate the drawbacks of prior-art technology and to achieve a procedure and apparatus for the measurement of elevator load that are significantly better than the prior-art solutions.

In the solution of the invention, the elevator load data is obtained from a measuring transducer mounted in conjunction with the anchorage of the first ends of the hoisting ropes, said anchorage being substantially immovably fixed in the elevator shaft.

Besides providing overload information, the load measuring arrangement of the invention can also be used for start adjustment and, if necessary, during travel as well. Moreover, general weight information is obtained, to be used e.g. for the definition of the degree of admission of the elevator car.

As the load measuring apparatus is mounted on an elevator guide rail, the rope forces can be passed via the guide rail directly down to the bottom of the elevator shaft, thus placing no load on the wall structures of the elevator shaft.

A great additional advantage is that only short connecting cables are needed with the measuring transducer of the invention because the measuring transducer is located near the control panel. This eliminates the measurement disturbances that are encountered in present equipment with long connecting cables. The apparatus of the invention is of a small size, and as it can be mounted on an elevator guide rail on the side facing towards the car, the apparatus takes up only a very small space in the elevator shaft. Further, especially when the apparatus of the invention is used with a strain gauge as the measuring transducer, a sufficient degree of safety regarding the suspension of the hoisting ropes is easily achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the following, the invention is described in detail by the aid of an example by referring to the attached drawings which are given by way of illustration only, and thus are not limitative of the present invention, and in which.

DETAILED DESCRIPTION OF THE PREFERRED EMBODIMENTS

Figure 4:
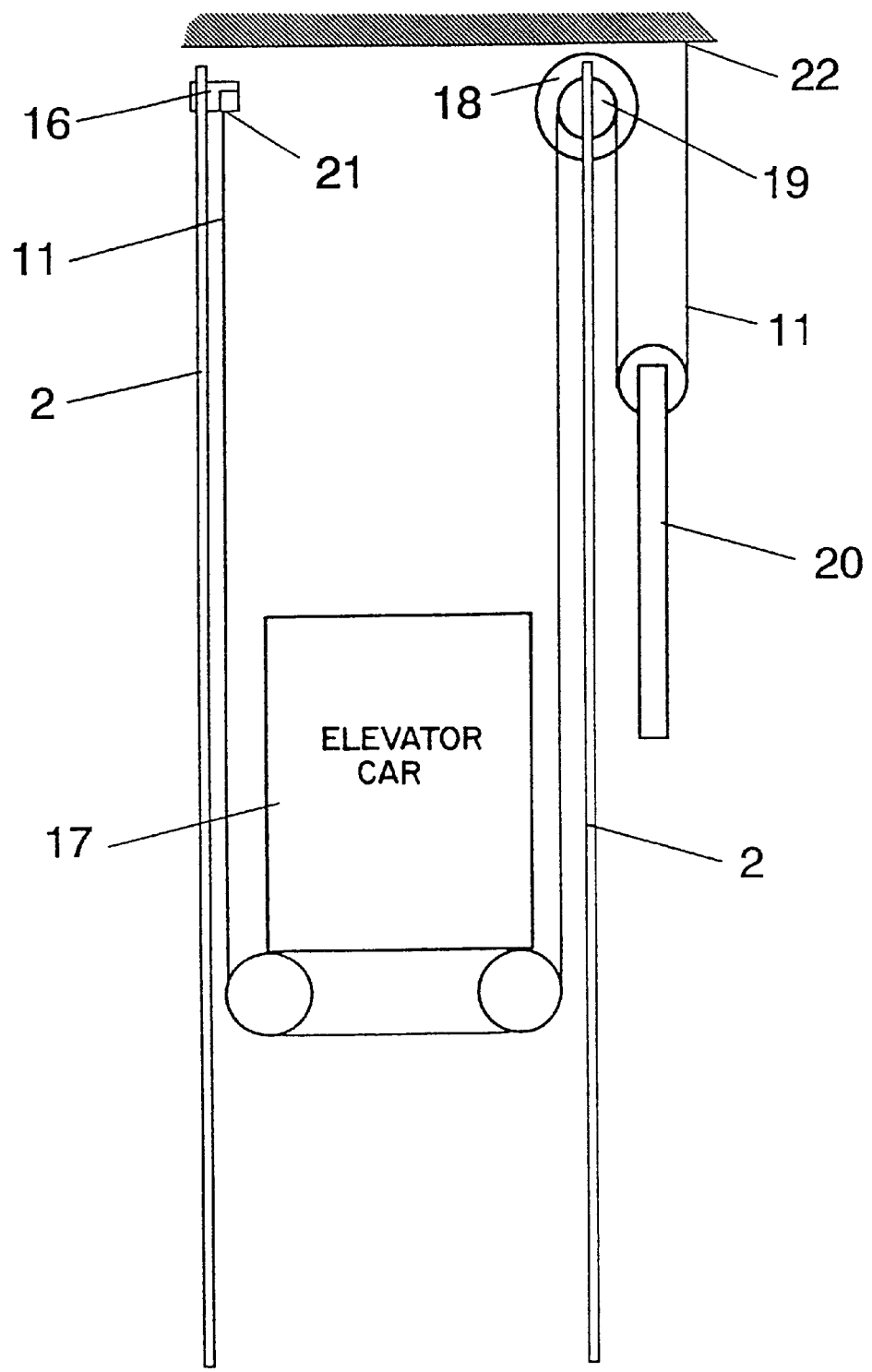
FIG. 4 presents a simplified diagram of the suspension of the elevator car.

In FIG. 4, is a simplified illustration of the suspension of the elevator car is shown. The various components are not necessarily shown in the correct location or relationship to each other. The elevator is provided with an elevator car 17 travelling along guide rails 2 in an elevator shaft, a counterweight 20 running along separate guide rails in the elevator shaft, a hoisting machinery 18, 19 placed in the elevator shaft, a control unit for the control of the hoisting machinery, and hoisting ropes 11. The hoisting ropes 11 are fitted to the elevator with a 1:2 suspension ratio so that the first ends of the hoisting ropes are attached to a first fixed anchorage 21 above the floor of the elevator car so that the hoisting ropes go downwards from the first anchorage, pass below the car around diverting pulleys placed under the elevator car and then up again to the hoisting machinery, where the hoisting ropes pass around a traction sheave 19 mounted in conjunction with the hoisting machinery and then go downward again to a diverting pulley connected to the counterweight, pass below said pulley and finally go up to a second fixed anchorage 22, to which the second ends of the hoisting ropes are attached.

Figures 1, 2, 3:
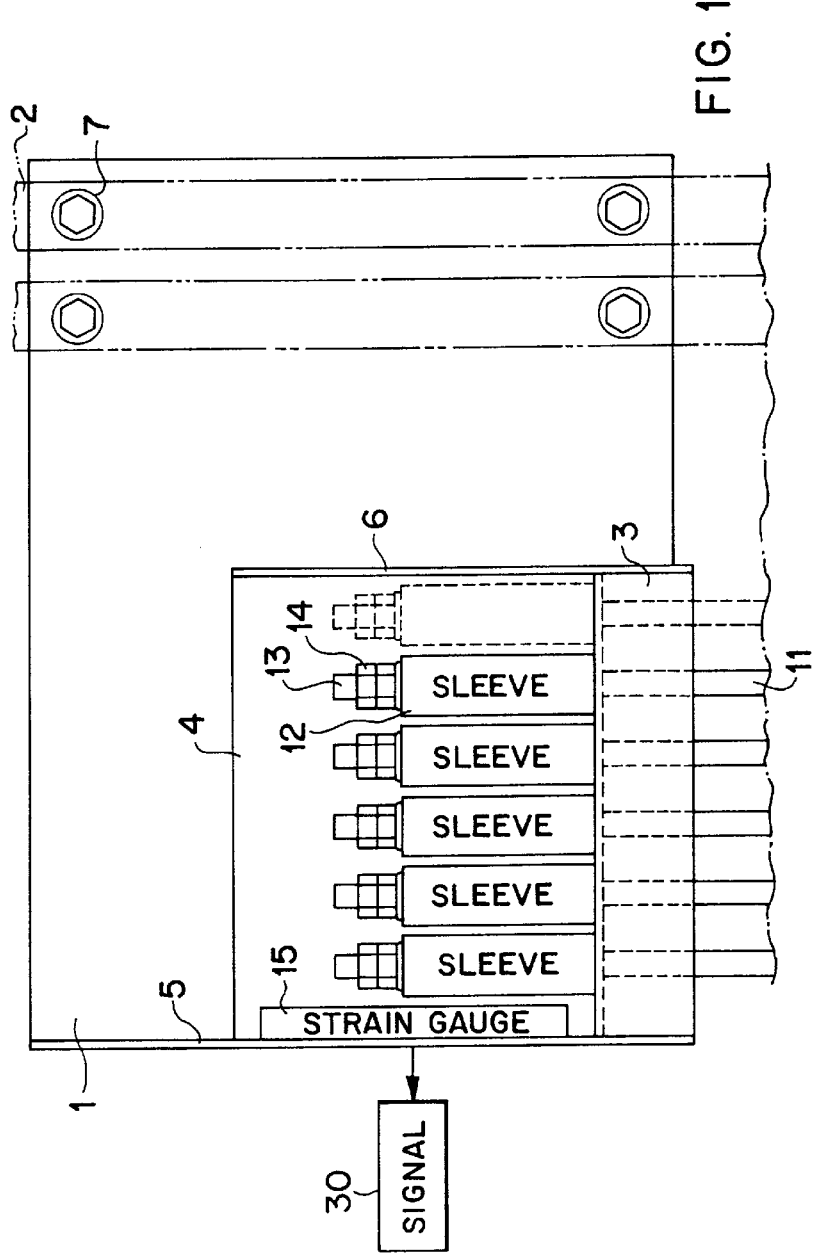
FIG. 1 presents the apparatus of the invention in front view.
FIG. 2 presents the apparatus of the invention in top view.
FIG. 3 presents the apparatus of the invention in side view.

FIGS. 1–3 present a load measuring apparatus 16 as provided by the invention, seen from different directions. The load measuring apparatus comprises a rectangular, plate-like frame part 1, which is attached to the upper part of a vertical car guide rail 2 in the elevator shaft, on the side of the rail facing towards the elevator car, a suspension tray 3 fitted to the lower edge of an opening 4 in the lower part of one edge (in FIG. 1, the left-hand edge) of the frame in a centric fashion relative to the frame plate as seen from above (FIG. 2), and a vertical edge flange 5, which is placed on the outer side of the frame plate with respect to the guide rail and is of the same height with the frame plate and acts as a base element, and a second vertical edge flange 6 placed at the inner edge of the suspension tray 3 with respect to the guide rail and having a height e.g. equal to the height of the opening 4. The suspension tray 3 is fixed by its first end to the lower part of edge flange 5 and by its second end to the lower part of edge flange 6. In respect of its geometry, the edge flange 5 acting as a base element is so designed that the force applied to the edge flange by the hoisting ropes causes a substantially large elastic deformation in the edge flange.

In the upper and lower parts of its one edge, the frame plate 1 has mounting holes 7 by which the frame plate 1 is attached to the guide rail 2 by means of bolts 8 and nuts 9. The horizontal suspension tray 3, which has the shape of an inverted letter U in cross-section as shown in FIG. 3, is provided with six holes 10 for the hoisting ropes 11. In the present case only five hoisting ropes are needed, said ropes coming from the elevator car below. The sixth hoisting rope, which is not needed in this example, is depicted with broken lines. The first ends of the hoisting ropes 11 are provided with suspension sleeves 12 fitted above the suspension tray, and the sleeves are fastened to the ends of the hoisting ropes 11 by means of a nut 14 and a thread 13 provided at the upper end each sleeve.

For the measurement of the load of the elevator car, a strain gauge 15 used as a measuring transducer is attached to edge flange 5 on the side facing towards the guide rail, placed in the middle region of the flange. The strain gauge can be attached to the flange 5 by gluing. The strain gauge 15 is provided with a bridge circuit and it measures the downward tension of the edge flange 5. The edge-flange 5 is subject to half the load applied to the suspension tray 3, which consists of the weight of the elevator car and its load as well as the weight of that part of the hoisting ropes 11 which is between the elevator car and this first anchorage. When the load of the elevator car is to be measured, the weight of the car and the above-mentioned part of the hoisting ropes must be subtracted from the measurement result.

The measurement signal 30 is passed from the strain gauge 15 via short connecting cables to an amplifier placed in an instrument panel near the rope anchorage and further to the elevator control unit. The short length of the connecting cables is, as described above, a result of the fact that the apparatus 16 is mounted near the instrument panel. As stated above, the load information can also be used for other control purposes, e.g. for start adjustment and, if necessary, also during elevator travel.

The structure of the load measuring device of the invention has been described above by referring to an example. In the procedure of the invention, that portion of the force resulting from the load of the elevator car which acts on the anchorage 21 is passed via the hoisting ropes 11 to a load measuring apparatus 16 mounted at the anchorage of the ends of the hoisting ropes, in which apparatus 16 at least part of the force applied to it is transmitted further to an edge flange 5 acting as a base element and the force acting on the edge flange 5 is measured by means of a strain gauge 15 attached to the edge flange and the measured force is transmitted to the elevator control unit for further processing.

It is obvious to a person skilled in the art that different embodiments of the invention are not restricted to the example described above, but that they may be varied within the scope of the claims presented below. The number of hoisting ropes 11 depends on the elevator in each case, and the elevator may have more hoisting ropes than the suspension tray 3 can accommodate. This has been indicated in the figures by depicting one of the ropes 11, sleeves 12, threads 13 and nuts 14 with broken lines. Moreover, the shape of the frame structure of the apparatus 16 may differ from that given in the above description. The essential feature is that the measuring transducer is mounted on a base 5 that is substantially thin in comparison with the other parts of the frame structure, so that the force applied to it will subject the base of the measuring transducer and therefore the measuring transducer itself to a large deformation. Thus, due to its geometric structure, the apparatus acts as a kind of force amplifier. Also, instead of a strain gauge, the measuring transducer may be a telltale or other corresponding transducer which can be used to measure the desired force.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An apparatus for measurement of a load of an elevator, the elevator including an elevator car movable in an elevator shaft, a counterweight, hoisting machinery, a control unit and hoisting ropes attached at least by one end to an anchorage in the elevator shaft, the load measuring apparatus comprising a measuring transducer which generates a signal corresponding to a measured load, the measuring transducer being attached to the anchorage and the anchorage being in a fixed location in the elevator shaft thereby avoiding a machine room.

2. The apparatus for measurement of a load as recited in claim 1, wherein the elevator includes guide rails and wherein the anchorage is attached to at least one of the guide rails in the elevator shaft.

3. The apparatus for measurement of a load as recited in claim 2, wherein the elevator car is movable along the guide rails in the elevator shaft and wherein the load measuring apparatus is in a position to avoid interference with movement of the elevator car.

4. The apparatus for measurement of a load as recited in claim 1, wherein the signal generated by the measuring transducer is an electrical signal.

5. The apparatus for measurement of a load as recited in claim 1, wherein the measuring transducer is attached to a flange of the anchorage.

6. The apparatus for measurement of a load as recited in claim 5, wherein the elevator includes guide rails and wherein a face of the flange of the anchorage faces the guide rails.

7. The apparatus for measurement of a load as recited in claim 6, wherein the flange and the guide rails are generally parallel.

8. The apparatus for measurement of a load as recited in claim 5, wherein the flange of the anchorage is vertically oriented.

9. The apparatus for measurement of a load as recited in claim 5, wherein the flange of the anchorage and the load measuring transducer are both vertically oriented.

10. The apparatus for measurement of a load as recited in claim 5, wherein the load measuring apparatus measures strain in the flange created by the load of the elevator.

11. The apparatus for measurement of a load as recited in claim 5, wherein the flange is positioned away from the at least one ends of the hoisting ropes and is without any openings through which the hoisting ropes pass.

12. The apparatus for measurement of a load as recited in claim 5, wherein the load measuring apparatus is affixed to the flange by gluing.

13. A method for measuring a load of an elevator, the elevator including an elevator car movable in an elevator shaft, a counterweight, hoisting machinery, a control unit and hoisting ropes attached at least by one end to an anchorage in the elevator shaft, the method comprising the steps of:

provhiding a measuring transducer in a fixed location in the elevator shaft so that a machine room is avoided;

measuring a load of the elevator with the measuring transducer; and generating a signal corresponding to a load measured by the measuring transducer.

14. The method for measuring a load of an elevator as recited in claim 13, further comprising the steps of using guide rails and wherein the fixed location is on the guide rails.

15. The method for measuring a load of an elevator as recited in claim 14, further comprising the step of guiding the elevator car with the guide rails.

16. The method for measuring a load of an elevator as recited in claim 13, further comprising the step of generating an electrical signal during the step of generating a signal.

17. The method for measuring a load of an elevator as recited in claim 13, further comprising the step of positioning the measuring transducer on a flange of an anchorage, the anchorage being at the fixed location in the elevator shaft.

18. The method for measuring a load of an elevator as recited in claim 17, wherein the step of measuring measures strain in the flange, the flange being vertically oriented.

19. The method for measuring a load of an elevator as recited in claim 17, wherein the step of measuring measures strain in the flange, the flange being generally parallel to at least one guide rail in the elevator shaft.

* * * * *